(12) United States Patent
Kennedy et al.

(10) Patent No.: US 10,899,869 B2
(45) Date of Patent: Jan. 26, 2021

(54) GLYCEROL CONTAINING POLYURETHANES AND POLYURETHANE NANOCOMPOSITES

(71) Applicants: Joseph Kennedy, Akron, OH (US); Turgut Nugay, Sariyer-Istanbul (TR); Nihan Nugay, Sariyer-Istanbul (TR)

(72) Inventors: Joseph Kennedy, Akron, OH (US); Turgut Nugay, Sariyer-Istanbul (TR); Nihan Nugay, Sariyer-Istanbul (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 0 days.

(21) Appl. No.: 16/751,683

(22) Filed: Jan. 24, 2020

(65) Prior Publication Data
US 2020/0239620 A1 Jul. 30, 2020

Related U.S. Application Data

(60) Provisional application No. 62/796,375, filed on Jan. 24, 2019.

(51) Int. Cl.
*C08G 18/62* (2006.01)
*C08G 18/32* (2006.01)
*C08G 18/76* (2006.01)

(52) U.S. Cl.
CPC ..... *C08G 18/6212* (2013.01); *C08G 18/3206* (2013.01); *C08G 18/7671* (2013.01)

(58) Field of Classification Search
CPC ........... C08G 18/6212; C08G 18/7671; C08G 18/3206; C08G 18/10; C08G 18/6517; C08G 18/3228; C08G 18/44; C08G 18/48; C08G 18/61; C08G 18/6204; C08G 18/246; C08K 3/346
See application file for complete search history.

(56) References Cited

U.S. PATENT DOCUMENTS

| | | | |
|---|---|---|---|
| 9,587,069 B2 | 3/2017 | Kennedy et al. | |
| 2005/0137288 A1 | 6/2005 | Maruo | |
| 2009/0036445 A1 | 2/2009 | Bonjouklian | |
| 2010/0023104 A1 | 1/2010 | Desai | |
| 2010/0047550 A1* | 2/2010 | Prissok | C08G 18/664 428/313.5 |
| 2015/0191566 A1* | 7/2015 | Kennedy | C08K 9/04 525/459 |

OTHER PUBLICATIONS

Shuo, et al.; J. Appl. Polym. Sci., 94, 534, (2004).
Tien and Wei: Macromolecules, 34, 9045 (2001).

* cited by examiner

*Primary Examiner* — Andrew J. Oyer
(74) *Attorney, Agent, or Firm* — Renner, Kenner, Greive, Bobak, Taylor & Weber

(57) ABSTRACT

The present invention generally relates to polyurethanes and polyurethane nanocomposites having improved mechanical, rheological, and thermal properties over ordinarily produced polyurethanes and polyurethane nanocomposites. Such polyurethanes and polyurethane nanocomposites include very small amounts of a small chain diol, such as glycerol, and more specifically, between 0.01 and 4 weight percent of the small chain diol, based on the total polymer composition.

20 Claims, 3 Drawing Sheets

Synthetic route for PIB-PU/G

Synthetic route for PIB-PU/G

—— Hard Segment
∿∿∿ PIB (Soft Segment)
▭ OmMMT

GLYCEROL CONTAINING POLYURETHANES AND POLYURETHANE NANOCOMPOSITES

CROSS-REFERENCE TO RELATED APPLICATIONS

This patent application claims the benefit of U.S. Provisional Patent Application No. 62/796,375, filed on Jan. 24, 2019, entitled "Minor Amounts of Glycerol Improve the Properties of Polyisobutylene-Based Polyurethane and its Nanocomposites", the entirety of which is hereby incorporated by reference.

FIELD OF THE INVENTION

The present invention generally relates to novel polyurethanes and polyurethane nanocomposites. More particularly, the polyurethanes and polyurethane nanocomposites include a minor amount, i.e., less than about 4.0 wt. % based upon the total polymer composition, of a small chain diol. It has been found that minor amounts of a small chain diol, such as glycerol, added polyurethanes and polyurethane nanocomposites substantially improve tensile strength, ultimate elongation, elastic modulus, toughness, rubbery plateau, flow temperature, creep, permanent set, rate of recovery after loading, and thermal properties as compared to polyurethanes and polyurethane nanocomposites made without a minor amount of a small chain diol. Further improvements in such properties can be obtained where the polyurethanes and polyurethane nanocomposites containing a minor amount of a small chain diol and further include clays, such as montmorillonite.

BACKGROUND OF THE INVENTION

It is known that some properties of many kinds of polymers (e.g., various rubbers, polyesters, polystyrenes, polyepoxides, etc.) can be enhanced, and their costs reduced, by the addition of various inexpensive layered silicates or clays, such as montmorillonite (MMT). However, there are issues of compatibility between the use of such polymers and these polar inorganic solids. Thus, it is known in the art to modify these polar inorganic solids with organic chemicals to enhance their compatibility with organic polymers, and hence, to obtain composites with improved properties.

Among the advances in organically-modifying these inorganic solids are the use of quaternary ammonium cations having a relatively long hydrocarbon substituent (e.g., $^+NR_3$—$C_{16}$). These cations are particularly well suited for use as swelling agents and modifiers of MMT. The —$NR_3^+$ function of the modifier cation becomes ionically bound to the clay, disrupts its layered structure, and thus enables the entry (intercalation) of polymers in-between the clay's layers (galleries). The relatively long hydrocarbon substituent of the modifier renders the clay essentially organophilic and enhances the compatibility of the clay with synthetic polymers such as those listed above. Exfoliation occurs when the layers of the clay are essentially completely disrupted and the individual layers separate.

Blends of layered clays with polymers are often termed "nanocomposites" because at least one of the dimensions of the clay's layers is in the nanometer dimension. The properties of such nanocomposites are often superior to the virgin polymer. Considerable research and development is being carried out toward the preparation, characterization and testing of such nanocomposites.

Shuo et al., *J. Appl. Polym. Sci.*, 94, 534, (2004) alleges the preparation of polyurethane nanocomposites by the use of an organically-modified montmorillonite (OmMMT). The MMT is modified by 1,6-hexamethylene diamine ($NH_2$—$(CH_2)_6$—$NH_2$). The reference discloses that this OmMMT is used as a chain extender to replace part of the conventional 1,2-propane diamine ($NH_2$—$CH_2CH(NH_2)CH_3$) chain extender for the preparation of polyurethanes. Shuo et al. dissolves the $NH_2$—$(CH_2)_6$—$NH_2$ in aqueous HCl and assumed that the quaternary head group of the $^+NH_3$—$(CH_2)_6$—$NH_2$ so formed becomes (a) electrostatically attached to the negatively charged MMT-, and (b) will also react with isocyanate groups to produce a urea linkage: MMT$^-$-$NH_2^+$—CONH—. They further postulated that the (non-quaternized)—$NH_2$ end group reacts with another isocyanate group and yields a further urea linkage: —NH—CO—NH—. In other words, Shuo et al. regard their OmMMT as a MMT-tethered chain extender. The authors illustrated their proposition with chemical equations (see Scheme 2 in the Shuo et al. reference). However, this proposition is flawed because the relatively highly acidic —$NH_3^+$ will preferentially protonate the basic —SiO— sites in the MMT (—NH3$^+$+—SiO—═—$NH_2^+$—SiOH$^+$—) and the ionic attachment between the modifier and MMT will diminish if it will occur at all (i.e., the organic amine will likely not be bound to the MMT). Indeed, Shuo et al. recovered polymer by solvent extraction from their nanocomposite, which indicates a lack of attachment between the MMT and their modifier. Further, Shuo et al. fails to demonstrate direct attachment between the MMT and the modifier, for example, by spectroscopic analysis or other means.

Tien and Wei, Macromolecules, 34, 9045, (2001) employ a similar strategy to enhance the properties of polyurethanes. In that reference, Tien and Wei quaternized mono-, di-, and tri-hydroxyl amino alcohols (3-amino-1-propanol, 3-amino-1,2-propane diol, and tris(hydroxymethyl) amino methane) with HCl, and used these quaternized amines as swelling (exfoliating) agents with MMT. The —$NH_3^+$ groups were assumed to be ionically connected to the MMT and the free —OH groups to react with isocyanates. However, in these systems, just as with Shou et al.'s systems (see above), the —$NH_3^+$ will preferentially protonate the basic —SiO— sites in MMT, which will severely diminish if not altogether eliminate the ionic linkage between the modifier and MMT.

The inventors of the present invention have previously found that polyurethane prepolymers and polyurethanes that included very small amounts of organically-modified layered clays, and more specifically, less than 1 weight percent, based upon the total polymer composition, of a layered clay exfoliated with organic quaternary ammonium salts having alkyl substituents, wherein at least one of the alkyl substituents carries an —$NH_2$, have improved mechanical properties over ordinarily produced polyurethanes and polyurethane nanocomposites. See U.S. Pat. No. 9,587,069, herein incorporated by reference.

However, there is a need in the art for polyurethanes and polyurethane nanocomposites that have even stronger mechanical, rheological, and thermal properties.

SUMMARY OF THE INVENTION

The present invention generally relates to polyurethanes or polyurethane nanocomposites having improved mechanical properties over ordinarily produced polyurethanes or polyurethane nanocomposites. It will be appreciated that the generally recognized understanding of the term "polyurethanes" is inclusive of polyurethanes, polyureas, and polyurethane/polyureas. Thus, throughout this disclosure, where the term "polyurethane(s)" is used, it will be with this recognition that the term includes all three of these sub-groups, unless it is clear that the sub-group polyurethane is being discussed. The sub-group polyurethane will be understood to be associated with the use of a diol with diisocyanate. The sub-group polyurea will be understood to be associated with the use of a diamine with a diisocyanate. And the sub-group of polyurethane/polyurea will be associated with the combination of a —OH group and a —NH$_2$ group. It will also be appreciated that the term "polyurethane nanocomposites" refers to blends of layered clays with polyurethane polymers as described hereinabove.

The term "prepolymer," where used, refers to the production of a shorter chain composition having a definitive number of mer units that does not include any chain extenders in the reaction product. The number of mer units, however, is a large enough number such that the prepolymer has a number average molecular weight of at least 750 g/mol. That is, there are essentially two options for producing the polyurethanes of the present invention. First, one can prepare a prepolymer and then have the prepolymer undergo a reaction with a chain extender and/or a short chain diol to form the polyurethane as a two-step method. Given that the present invention envisions a stoichiometric excess of diisocyanate, the diisocyanate groups will be provided on the ends of the prepolymer and will enable the chain extenders and/or short chain diols to react with the one or more of the isocyanate end groups. Or second, one can include the chain extender and/or short chain diols during the initial polymer reaction such that the polyurethane is produced in a one-step method.

In at least one embodiment, the present invention provides a polyurethane comprising the reaction product of: a diol and/or a diamine having a weight average molecular weight of at least 750 g/mole; a stoichiometric excess amount of diisocyanate; and from 0.01 to 4.0 weight percent, based upon the total polymer composition, of a small chain diol having from 2 to 10 carbon atoms and having a number average molecular weight of less than 750 g/mole. In narrower embodiments, the small chain diol may have from 3 to 6 carbon atoms.

In one or more embodiments, the present invention provides a polyurethane wherein the diol is selected from the group consisting of polyisobutylene-based diols, polyether polyols, polysiloxane polyols, and polycarbonate polyols, and combinations thereof.

In the same or other embodiments, the present invention provides a polyurethane wherein the diol is selected from the group consisting of HO—PIB—OH, HO—PTMO—OH, or a combination thereof, and wherein each diol has a molecular weight of at least 1000 g/mole.

In other embodiments, the present invention provides a polyurethane in the form of a polyurea wherein the diamine is selected from the group consisting of H$_2$N—PIB—NH$_2$, H$_2$N—PTMO—NH$_2$, or a combination thereof, and wherein each diamine has a molecular weight of at least 1000 g/mole.

In the same or other embodiments, the present invention provides a polyurethane wherein the diisocyanate is selected from the group consisting of 4,4'-methylene diphenyl diisocyanate (MDI) and/or 4,4'-methylene dicyclohexyl diisocyanate (HMDI).

In the same or other embodiments, the present invention provides a polyurethane wherein from 0.10 to 1.00 weight percent, based on the total polymer composition, of the small chain diol is used. In narrower embodiments, the present invention provides a polyurethane wherein from 0.15 to 0.50 weight percent, based on the total polymer composition, of the small chain diol is used. And in even narrower embodiments, the present invention provides a polyurethane wherein from 0.20 to 0.30 weight percent, based on the total polymer composition, of the small chain diol is used.

In the same or other embodiments, the present invention provides a polyurethane wherein the small chain diol is selected from the group consisting of erythritol, xylitol, sorbitol, and glycerol.

In the same or other embodiments, the present invention provides a polyurethane further comprising 0.001 to 1.0 weight percent, based upon the total polymer composition, of a layered clay with organic quaternary ammonium salts having alkyl substituents, wherein at least one of the alkyl substituents carries an —NH$_2$ group.

In the same or other embodiments, the present invention provides a polyurethane wherein the layered clay is selected from the group consisting of 2:1 phyllosilicates-smectite groups, montmorillonite, beidellite, nontronite, saponite, (F-)hectorite, stevensite, vermiculite.paragonite, clinochlore and thuringite.

In the same or other embodiments, the present invention provides a polyurethane wherein from 0.001 to 0.9 weight percent, based on the total polymer composition, of layered clay exfoliated with organic quaternary ammonium salts having alkyl substituents, wherein at least one of the alkyl substituents carries an —NH$_2$ group, is used. In narrower embodiments, the present invention provides a polyurethane wherein from 0.01 to 0.8 weight percent, based on the total polymer composition, of layered clay exfoliated with organic quaternary ammonium salts having alkyl substituents, wherein at least one of the alkyl substituents carries an —NH$_2$ group, is used. In still narrower embodiments, the present invention provides a polyurethane wherein from 0.1 to 0.7 weight percent, based on the total polymer composition, of layered clay exfoliated with organic quaternary ammonium salts having alkyl substituents, wherein at least one of the alkyl substituents carries an —NH$_2$ group, is used. And in even narrower embodiments, the present invention provides a polyurethane wherein from 0.4 to 0.6 weight percent, based on the total polymer composition, of layered clay exfoliated with organic quaternary ammonium salts having alkyl substituents, wherein at least one of the alkyl substituents carries an —NH$_2$ group, is used.

In the same or other embodiments, the present invention provides a polyurethane further comprising a chain extender. Such a chain extender may be selected from the group consisting of 1,4-butane diol (BDO), 1,6-hexanediol (HDO), 1,6-haxamethylene diamine (HDA), and a hydrogen-accepting chain extenders (HACE).

In the same or other embodiments, the present invention provides a polyurethane further comprising less than 1 weight percent, based upon the total polymer composition, of a layered clay with organic quaternary ammonium salts having alkyl substituents, wherein at least one of the alkyl substituents carries an —NH$_2$ group.

In further embodiments, the present invention provides a polyurethane comprising the reaction product of a diol and/or a diamine having a number average molecular weight of at least 750 g/mole, a stoichiometric excess amount of diisocyanate, from 0.01 to 4.0 weight percent, based upon the total polymer composition, of a small chain diol having from 2 to 10 carbon atoms and having a number average molecular weight of less than 750 g/mole, and less than 1 weight percent, based upon the total polymer composition, of a layered clay with organic quaternary ammonium salts having alkyl substituents, wherein at least one of the alkyl substituents carries an —NH$_2$ group.

In the same or other further embodiments, the present invention provides a polyurethane wherein the diol is selected from the group consisting of polyisobutylene-based diols, polyether polyols, polysiloxane polyols, and polycarbonate polyols, and combinations thereof.

In the same or other further embodiments, the present invention provides a polyurethane as in any embodiment above, wherein the diol is selected from the group consisting of HO—PIB—OH, HO—PTMO—OH, or a combination thereof, and wherein each diol has a molecular weight of at least 1000 g/mole.

In the same or other further embodiments, the present invention provides a polyurethane wherein the polyurethane is a polyuria and wherein the diamine is selected from the group consisting of H$_2$N—PIB—NH$_2$, H$_2$N—PTMO—NH$_2$, or a combination thereof, and wherein each diamine has a molecular weight of at least 1000 g/mole.

In the same or other further embodiments, the present invention provides a polyurethane wherein the diisocyanate is selected from the group consisting of 4,4'-methylene diphenyl diisocyanate (MDI) and/or 4,4'-methylene dicyclohexyl diisocyanate (HMDI).

In the same or other further embodiments, the present invention provides a polyurethane wherein from 0.10 to 1.00 weight percent, based on the total polymer composition, of the small chain diol is used. In narrower embodiments, the present invention provides a polyurethane wherein from 0.15 to 0.50 weight percent, based on the total polymer composition, of the small chain diol is used. In still narrower embodiments, the present invention provides a polyurethane wherein from 0.20 to 0.30 weight percent, based on the total polymer composition, of the small chain diol is used.

In the same or other further embodiments, the present invention provides a polyurethane wherein the small chain diol is selected from the group consisting of erythritol, xylitol, sorbitol, and glycerol.

In the same or other further embodiments, the present invention provides a polyurethane wherein the layered clay is selected from the group consisting of 2:1 phyllosilicates-smectite groups, montmorillonite, beidellite, nontronite, saponite, (F-) hectorite, stevensite, vermiculite.paragonite, clinochlore and thuringite.

In the same or other further embodiments, the present invention provides a polyurethane wherein from 0.001 to 0.9 weight percent, based on the total polymer composition, of layered clay exfoliated with organic quaternary ammonium salts having alkyl substituents, wherein at least one of the alkyl substituents carries an —NH$_2$ group, is used. In narrower embodiments, the present invention provides a polyurethane wherein from 0.01 to 0.8 weight percent, based on the total polymer composition, of layered clay exfoliated with organic quaternary ammonium salts having alkyl substituents, wherein at least one of the alkyl substituents carries an —NH$_2$ group, is used. In still narrower embodiments, the present invention provides a polyurethane wherein from 0.1 to 0.7 weight percent, based on the total polymer composition, of layered clay exfoliated with organic quaternary ammonium salts having alkyl substituents, wherein at least one of the alkyl substituents carries an —NH$_2$ group, is used. In even narrower embodiments, the present invention provides a polyurethane wherein from 0.4 to 0.6 weight percent, based on the total polymer composition, of layered clay exfoliated with organic quaternary ammonium salts having alkyl substituents, wherein at least one of the alkyl substituents carries an —NH$_2$ group, is used.

In the same or other further embodiments, the present invention provides a polyurethane as in any embodiment above, further comprising an additional chain extender. The chain extender may be selected from the group consisting of 1,4-butane diol (BDO), 1,6-hexanediol (HDO), 1,6-haxamethylene diamine (HDA), and a hydrogen-accepting chain extenders (HACE).

It will be appreciated that the addition of small chain diols advantageously increases the number of —OH sites for H-bonding with OmMMT and other polyurethanes with the composition. However, it has been unexpected and surprising that, with the addition of only a very small amount of such small chain diols, significant increases in the mechanical properties can be obtained.

DETAILED DESCRIPTION OF ILLUSTRATIVE EMBODIMENTS

Figure 1:
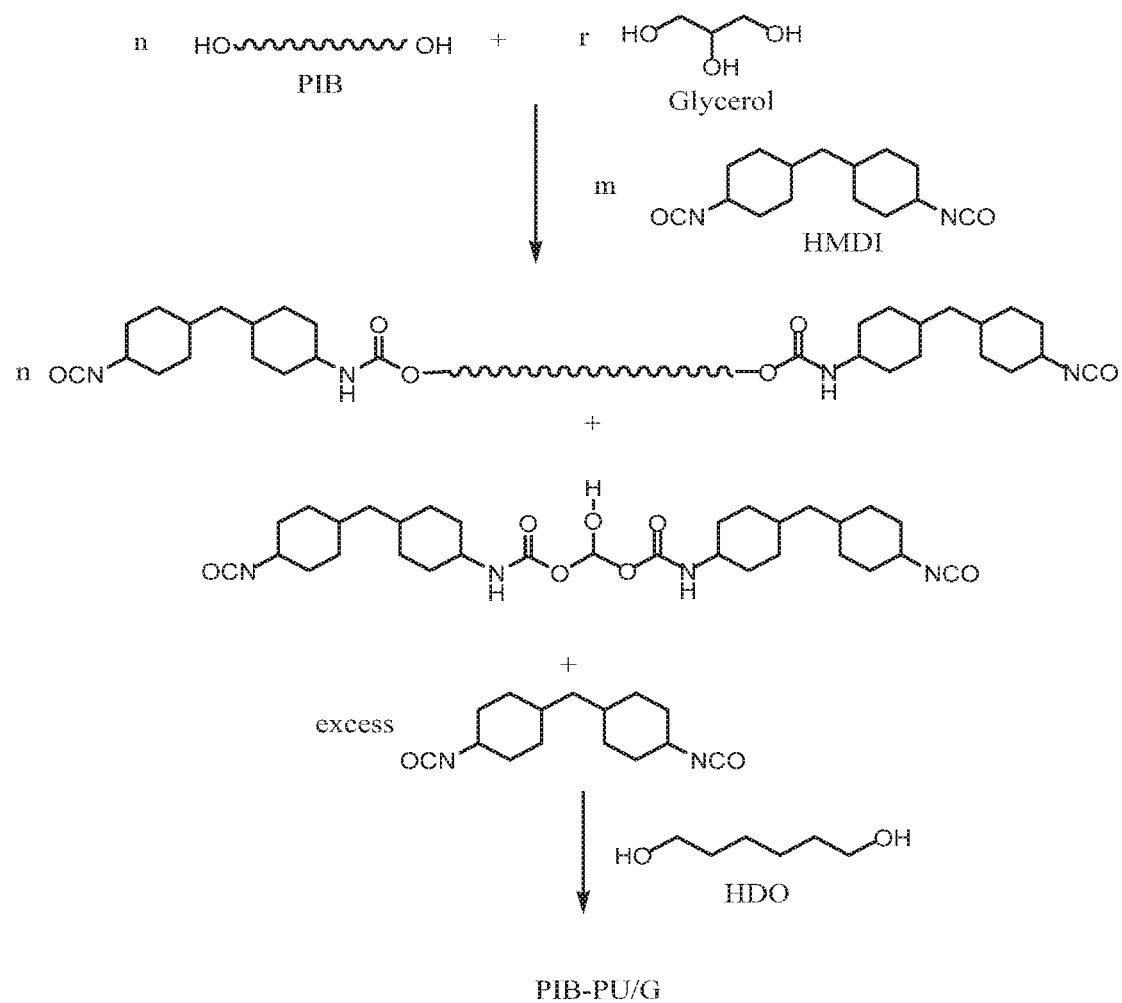
FIG. 1 is a synthesis scheme for the production of a polyisobutylene-based polyurethane including a minor amount of glycerol in accordance with the present invention.

The present invention generally relates to the production of polyurethanes and polyurethane nanocomposites containing very small amounts of a small chain diol, such as glycerol, to produce polyurethanes and polyurethane nanocomposites with greatly improved properties relative to those of unadulterated virgin polyurethanes and polyurethane nanocomposites. Such polyurethanes and polyurethane nanocomposites are believed to be particularly suited for use in medical devices.

Small chain diols are herein defined as diols having from 2 to 10 carbon atoms, preferably, from 3 to 6 carbon atoms, and a number average molecular weight of less than 750 g/mole, preferably less than 400 g/mole, and more preferably, less than 200 g/mole. Such small chain diols suitable for use in the present invention include, but are not limited to, erythritol, xylitol, sorbitol, and glycerol. In one embodiment of the present invention, the small chain diol is glycerol.

Polyurethane Prepolymer

In one embodiment, polyurethanes of the present invention can be prepared by first preparing polyurethane prepolymers. The polyurethane prepolymers may be made from the reaction product of a diol and a stoichiometric excess of diisocyanate. Any diol known and used in the art for the production of polyurethanes may be used. Examples of such diols include polyisobutylene-based diols, such as HO—PIB—OH; polyether polyols, such as polytetramethylene oxide diols (HO—PTMO—OH) and polyhexamethylene diols; polysiloxane polyols, such as polydimethylsiloxane diols (HO—PDMS—OH); and polycarbonate polyols, such as polyhexamethylene carbonate diols, and combinations thereof. In one embodiment, each diol has a molecular weight of at least 750 g/mole and more particularly, at least 1000 g/mole.

In another embodiment, polyurea prepolymers may be made from the reaction product of a diamine and a stoichiometric excess of diisocyanate. Any diamine known and used in the art for the production of polyureas may be used. Examples of such diamines $H_2N$—PIB—$NH_2$ or $H_2N$—PTMO—$NH_2$ or combinations of the two. In one embodiment, each diamine has a molecular weight of at least 750 g/mole and more particularly, at least 1000 g/mole.

In another embodiment, polyurethane-urea prepolymers may be made from the reaction product of a diamine and a diol and a stoichiometric excess of diisocyanate. Any compound having a diamine and a diol known and used in the art in the production of polyurethane/polyureas may be used. Examples of such diamines and diols include polyisobutylene-based compounds such as HO—PIB—$NH_2$, or HO—PTMO—$NH_2$ or combinations of the two. In one embodiment, each diamine/diol compound has a molecular weight of at least 750 g/mole and more particularly, at least 1000 g/mole.

In all three embodiments related to the production of prepolymers, the prepolymer includes a stoichiometric excess of diisocyanate. That is, the molar ratio of diol/diamine to diisocyanate should be such that a little more diisocyanate is provided and remains in excess so as to ensure that the diisocyanates are left on the ends of the prepolymer. Any diisocyanate known and used in the art in the production of polyurethanes may be used. Examples of such diisocyanates include 4,40-methylene diphenyl diisocyanate (MDI) and/or 4,40-methylene dicyclohexyl diisocyanate (HMDI). Again, a stoichiometric excess of diisocyanate is used. However, typically and in one embodiment, from about 50 to about 25 weight percent, based upon the total polymer composition, of diisocyanate is used, while from about 50 to about 75 weight percent, based upon the total polymer composition, of diol, diamine or amine/alcohol end group compound is used. In other embodiments from about 35 to about 48 weight percent, based upon the total polymer composition, of diisocyanate is used, while from about 52 to about 65 weight percent, based upon the total polymer composition, of diol, diamine or amine/alcohol end group compound is used.

In any of the three embodiments above, once the prepolymer is produced, it may be used as a reaction product, together with a minor amount of a small chain diol, to produce the desired polyurethanes of the present invention. In some embodiments, a minor amount of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. It be understood that small chain diols act essentially like a chain extender and will react with the isocyanate to form prepolymer chains and form the polyurethane polymers.

In any of the three embodiments above, in addition to the addition of a small chain diol to the polyurethane prepolymer, a conventional chain extender can be added to further form the polyurethane polymers of the present invention. Any conventional chain extender capable of reacting with the prepolymer may be used. In at least one embodiment, the conventional chain extender will react with the terminal isocyanate of the prepolymer chains and form the polyurethane polymers. Examples of suitable chain extenders include 1,4-butane diol (BDO), 1,6-hexanediol (HDO), 1,6-haxamethylene diamine (HDA), and a hydrogen-accepting chain extenders (HACE). Such HACE chain extenders typically have a molecular weight of less than 1000 g/mole, and in one embodiment, may have a molecular weight of less than 700 g/mole. Typically, from about 0.1 to about 30 weight percent of a traditional chain extender is used. In one embodiment, from about 2 to about 20 weight percent of a traditional chain extender is used.

The resultant polyurethanes formed have improved mechanical, rheological, and thermal properties. Specifically, the polyurethanes have been found to have increased tensile strength, ultimate elongation, elastic modulus, toughness, rubbery plateau, flow temperature, creep, permanent set, thermal properties, and rate of recovery after loading as compared to polyurethanes not including any additional small chain diol. That is, the polyurethanes exhibit increased mechanical, rheological, and thermal properties as compared to unadulterated virgin polyurethanes.

Polyurethanes

In another embodiment of the present invention, polyurethanes may be made from the reaction product of a diol; a stoichiometric excess of diisocyanate; and a minor amount of a small chain diol. In this method, the small chain diols compete with the PIB diols or other diols in the system to react with an isocyanate so as to form polymer chains and, specifically, polyurethane polymers. In some embodiments, a minor amount of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. Any diol known and used in the art for the production of polyurethane may be used. Examples of such diols include PIB-based diols, such as HO—PIB—OH; polyether polyols, such as polytetramethylene oxide diols (HO—PTMO—OH) and polyhexamethylene diols; polysiloxane polyols, such as polydimethylsiloxane diols (HO—PDMS—OH); and polycarbonate polyols, such as polyhexamethylene carbonate diols, and combinations thereof. In one embodiment, each diol has a molecular weight of at least 750 g/mole and more particularly, at least 1000 g/mole.

In another embodiment, polyureas may be made from the reaction product of a diamine; a stoichiometric excess of diisocyanate; and a minor amount of a small chain diol. Again, the small chain diols compete with the PIB diamines or other diols or diamines in the system to react with an isocyanate so as to form polymer chains and, specifically, polyurea polymers, where only diamines are used. In some embodiments, a minor amount of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. Any diamine known and used in the art for the production of polyureas may be used. Examples of such diamines include PIB-based diamines such as $H_2N$—PIB—$NH_2$, or $H_2N$—PTMO—$NH_2$ or combinations of the two. In one embodiment, each diamine has a molecular weight of at least 750 g/mole and more particularly, at least 1000 g/mole.

In another embodiment, polyurethane-ureas may be made from the reaction product of a diamine and a diol; a stoichiometric excess of diisocyanate; and a minor amount of a small chain diol. Again, the small chain diols compete with the PIB diols and diamines or other diols or diamines in the system to react with an isocyanate so as to form polymer chains and, specifically, polyurethane-urea polymers, where only diamines are used. In some embodiments, a minor amount of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. Any compound having a diamine and a diol known and used in the art in the production of polyurethane/polyureas may be used. Examples of such diamines and diols include PIB-based compounds such as HO—PIB—$NH_2$, or HO—PTMO—$NH_2$ or combinations of the two. In one embodiment, each diamine/diol compound has a molecular weight of at least 750 g/mole and more particularly, at least 1000 g/mole.

In all three embodiments above related to the production of polyurethane by a one-step method, the polyurethane includes a stoichiometric excess of diisocyanate. That is, the molar ratio of diol/diamine to diisocyanate should be such that a little more diisocyanate is provided and remains in excess so as to ensure that the diisocyanates are left on the ends of the prepolymer. Any diisocyanate known and used in the art in the production of polyurethanes may be used. Examples of such diisocyanates include 4,4☐-methylene diphenyl diisocyanate (MDI) and/or 4,4☐-methylene dicyclohexyl diisocyanate (HMDI). Again, a stoichiometric excess of diisocyanate is used. However, typically and in one embodiment, from about 50 to about 25 weight percent, based upon the total polymer composition, of diisocyanate is used, while from about 50 to about 75 weight percent, based upon the total polymer composition, of diol, diamine or amine/alcohol end group compound is used. In other embodiments from about 35 to about 48 weight percent, based upon the total polymer composition, of diisocyanate is used, while from about 52 to about 65 weight percent, based upon the total polymer composition, of diol, diamine or amine/alcohol end group compound is used.

In all three embodiments above related to the production of polyurethane by a one-step, in addition to the addition of a small chain diol to the polyurethane prepolymer, a traditional chain extender can be added to further form the polyurethane polymers of the present invention. Any traditional chain extender capable of reacting with the prepolymer may be used. In at least one embodiment, the conventional chain extender will react with the isocyanate to form prepolymer chains and form the polyurethane polymers. Examples of suitable chain extenders include 1,4-butane diol (BDO), 1,6-hexanediol (HDO), 1,6-haxamethylene diamine (HDA), and a hydrogen-accepting chain extenders (HACE). Such HACE chain extenders typically have a molecular weight of less than 1000 g/mole, and in one embodiment, may have a molecular weight of less than 700 g/mole. Typically, from about 0.1 to about 30 weight percent of a traditional chain extender is used. In one embodiment, from about 2 to about 20 weight percent of a traditional chain extender is used.

The resultant polyurethanes from have improved mechanical, rheological, and thermal properties. Specifically, the polyurethanes have been found to have increased tensile strength, ultimate elongation, elastic modulus, toughness, rubbery plateau, flow temperature, creep, permanent set, thermal properties, and rate of recovery after loading as compared to polyurethanes not including any additional small chain diol. That is, the polyurethanes exhibit increased mechanical, rheological, and thermal properties as compared to unadulterated virgin polyurethanes.

Polyurethane Nanocomposites

In one embodiment, polyurethane nanocomposites may be made from the reaction product of a diol having a molecular weight of at least 750 g/mol and a stoichiometric excess of diisocyanate, a minor amount of less than 4 weight percent, preferably less than 1 wt. %, and more preferably less than 0.5 wt. %, of a small chain diol having a molecular weight of less than 750 g/mol, together with less than 1 weight percent, based upon the total polymer composition, of a layered clay exfoliated with organic quaternary ammonium salts having alkyl substituents, wherein at least one of the alkyl substituents carries an —$NH_2$ group. In some embodiments, a minor amount of a small chain diol relates to between about 0.01 weight percent and about 4 weight percent, based upon the total polymer composition. In other embodiments, a minor amount of a small chain diol relates to between about 0.10 weight percent and about 1 weight percent, based upon the total polymer composition. In yet other embodiments, a minor amount of a small chain diol relates to between about 0.15 weight percent and about 0.5 weight percent, based upon the total polymer composition. In additional embodiments, a minor amount of a small chain diol relates to between 0.20 weight percent and about 0.30 weight percent, based upon the total polymer composition. Any diol known and used in the art for the production of polyurethane may be used. Examples of such diols include PIB-based diols, such as HO—PIB—OH; polyether polyols, such as polytetramethylene oxide diols (HO—PTMO—OH) and polyhexamethylene diols; polysiloxane polyols, such as polydimethylsiloxane diols (HO—PDMS—OH); and polycarbonate polyols, such as polyhexamethylene carbonate diols, and combinations thereof. In one embodiment, each diol has a molecular weight of at least 750 g/mole and more particularly, at least 1000 g/mole.

In another embodiment, polyurethane, polyurea or polyurethane-urea used in the production of polyurethane nanocomposites, may be made from the reaction product of a diamine having a molecular weight of at least 750 g/mol and a stoichiometric excess of diisocyanate, a minor amount of less than 4 weight percent, preferably less than 1 wt. %, and more preferably less than 0.5 wt. %, of a small chain diol having a molecular weight of less than 750 g/mol, together with less than 1 weight percent, based upon the total polymer composition, of a layered clay exfoliated with organic quaternary ammonium salts having alkyl substituents, wherein at least one of the alkyl substituents carries an —$NH_2$ group. In some embodiments, a minor amount of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. Any diamine known and used in the art for the production of polyureas may be used. Examples of such diamines include PIB-based diamines such as $H_2N$—PIB—$NH_2$, or $H_2N$—PTMO—$NH_2$ or combinations of the two. In one embodiment, each diamine has a molecular weight of at least 750 g/mole and more particularly, at least 1000 g/mole.

In another embodiment, polyurethane or polyurethane-urea, used in the production of polyurethane nanocomposites, may be made from the reaction product of a diamine and/or a diol, each having a molecular weight of at least 750 g/mol, with a stoichiometric excess of diisocyanate, a minor amount of a small chain diol having a molecular weight of less than 750 g/mol, together with less than 1 weight percent, based upon the total polymer composition, of a layered clay exfoliated with organic quaternary ammonium salts having alkyl substituents, wherein at least one of the alkyl substituents carries an —$NH_2$ group. In some embodiments, a minor amount of less than 4 weight percent, preferably less than 1 wt. %, and more preferably less than 0.5 wt. %, of a small chain diol relates to between about 0.01 weight percent and about 4.00 weight percent, based upon the total polymer composition. In other embodiments, a minor amount of a small chain diol relates to between about 0.10 weight percent and about 1.00 weight percent, based upon the total polymer composition. In yet other embodiments, a minor amount of a small chain diol relates to between about 0.15 weight percent and about 0.50 weight percent, based upon the total polymer composition. In additional embodiments, a minor amount of a small chain diol relates to between 0.20 weight percent and about 0.30 weight percent, based upon the total polymer composition. Any compound having a diamine and a diol known and used in the art in the production of polyurethane/polyureas may be used. Examples of such diamines and diols include PIB-based compounds such as HO—PIB—$NH_2$, or HO—PTMO—$NH_2$ or combinations of the two. In one embodiment, each diamine/diol compound has a molecular weight of at least 750 g/mole and more particularly, at least 1000 g/mole.

In all three embodiments above related to the production of polyurethane nanocomposites, the polyurethane nanocomposites are prepared with a stoichiometric excess of diisocyanate. That is, the molar ratio of diol/diamine to diisocyanate should be such that a little more diisocyanate is provided and remains in excess so as to ensure that the diisocyanates are left on the ends of the prepolymer. Any diisocyanate known and used in the art in the production of polyurethanes may be used. Examples of such diisocyanates include 4,4☐-methylene diphenyl diisocyanate (MDI) and/or 4,4☐-methylene dicyclohexyl diisocyanate (HMDI). Again, a stoichiometric excess of diisocyanate is used. However, typically and in one embodiment, from about 50 to about 25 weight percent, based upon the total polymer composition, of diisocyanate is used, while from about 50 to about 75 weight percent, based upon the total polymer composition, of diol, diamine or amine/alcohol end group compound is used. In other embodiments from about 35 to about 48 weight percent, based upon the total polymer composition, of diisocyanate is used, while from about 52 to about 65 weight percent, based upon the total polymer composition, of diol, diamine or amine/alcohol end group compound is used.

In all three embodiments above related to the production of polyurethane nanocomposites, layered clay is used. The layered clay can be any layered clay known and used in the art that is suitable and known for increasing the mechanical properties of polymers, namely polyurethanes. Such layered clays can include 2:1 phyllosilicates-smectite groups. In one embodiment, the layered clays may be selected from montmorillonite, beidellite, nontronite, saponite, (F-)hectorite, stevensite, vermiculite, paragonite, clinochlore and thuringite. In another embodiment, the layered clay is montmorillonite.

In all three embodiments above related to the production of polyurethane nanocomposites, the layered clays are organically modified. That is, the layer clay is swelled and ultimately exfoliated with organic quaternary ammonium salts in which at least one of the longer alkyl substituents has a —$NH_2$ group, preferably an end group. One example of such an organic quaternary ammonium salt is trimethyl-1-propyl amine ammonium iodide. In one embodiment, the —$NH_2$ group is a primary amine. In another embodiment, the —$NH_2$ group is a secondary amine. In one embodiment, the longest alkyl substituent has from 4 to 10 carbon atoms. In another embodiment, the longest alkyl substituent may be straight, branched, or cyclic. In other embodiments, the shortest of the alkyl substituents have 1 to 4 carbon atoms. It will be appreciated that the organic quaternary ammonium salts are ionically or electrostatically bonded to the layered clays, since the clays are negatively charged and the salts are positively charged at the —$NR_3+$ functionalities. In one or more embodiments, the layered clays are nanoclays, meaning that one dimension of the clay is in the nano range.

In any one embodiment of any of the three embodiments above related to the production of polyurethane nanocomposites, from 0.001 to 0.9 weight percent of layered clay exfoliated with organic quaternary ammonium salts having alkyl substituents, wherein at least one of the alkyl substituents carries an —$NH_2$ group, is used. In another embodiment, from 0.01 to 0.8 weight percent of layered clay exfoliated with organic quaternary ammonium salts having alkyl substituents, wherein at least one of the alkyl substituents carries an —$NH_2$ group, is used. In yet another embodiment, from 0.1 to 0.7 weight percent of layered clay exfoliated with organic quaternary ammonium salts having alkyl substituents, wherein at least one of the alkyl substituents carries an —$NH_2$ group, is used. In still another embodiment, from 0.4 to 0.6 weight percent, of layered clay exfoliated with organic quaternary ammonium salts having alkyl substituents, wherein at least one of the alkyl substituents carries an —$NH_2$ group, is used.

In all three embodiments above related to the production of polyurethane nanocomposites, in addition to the addition of a small chain diol to the polyurethane prepolymer, a conventional chain extender can be added to further form the polyurethane nanocomposites of the present invention. Any conventional chain extender capable of reacting with the prepolymer may be used. In at least one embodiment, the conventional chain extender will react with the isocyanate to form polymer chains and form the polyurethane polymers. Examples of suitable chain extenders include 1,4-butane diol (BDO), 1,6-hexanediol (HDO), 1,6-haxamethylene diamine (HDA), and a hydrogen-accepting chain extenders (HACE). Such HACE chain extenders typically have a molecular weight of less than 1000 g/mole, and in one embodiment, may have a molecular weight of less than 700 g/mole. Typically, from about 0.1 to about 30 weight percent of a traditional chain extender is used. In one embodiment, from about 2 to about 20 weight percent of a traditional chain extender is used.

The resultant polyurethane nanocomposites above have improved mechanical properties. Specifically, the polyurethane nanocomposites have been found to have increased tensile strength, ultimate elongation, elastic modulus, toughness, rubbery plateau, flow temperature, creep, permanent set, thermal properties, and rate of recovery after loading as compared to polyurethane nanocomposites not including any additional small chain diol. That is, the polyurethane nanocomposites exhibit increased mechanical, rheological, and thermal properties as compared to unadulterated polyurethane nanocomposites.

The synthesis of polyisobutylene based polyurethanes and polyurethane nanocomposites with optimum properties requires the use of precisely defined polyisobutylene diol, $HOCH_2$—PIB—$CH_2OH$, of $f_{n,CH2OH}$=2.0, i.e., hydroxyl-telechelic PIB with number average —$CH_2OH$ end-functionality of 2.0. Under less-costly ill-controlled conditions (e.g., if reactant purity or synthesis conditions are less than optimum) syntheses often yield imperfect polyisobutylene diols with $f_{n,CH2OH}$<2.0, typically with $f_{n,CH2OH}$=1.75–1.95.

It is believed that the introduction of the minor amount of a small chain diol, such as glycerol, (representing two —$CH_2OH$ groups) to low-cost polyisobutylene diols of $f_{n,CH2OH}$<2.0 will compensate the less than theoretical number of terminal —$CH_2OH$ groups, and that such imperfect polyisobutylene diols, plus calculated moles of glycerol, will produce quality polyisobutylene based polyurethane prepolymers, polyurethanes, and polyurethane nanocomposites.

The moles of glycerol (G) to compensate for —$CH_2OH$ deficiency can be calculated using Formula I, $$G = P \times 2/3 \times D$$  Formula I:

where P is the moles of $f_{n,CH2OH}$<2.0 polyisobutylene diol, and D is the molar —$CH_2OH$ deficiency. For example, 1 g polyisobutylene diol of $f_{nCH2OH}$=1.85 (i.e., D=0.15) with Mn=4,000 g/mole (i.e., P=$2.5 \times 10^{-4}$) would require G=$2.5 \times 10^{-4} \times 2/3 \times 0.15 = 2.5 \times 10^{-5}$ moles ($2.3 \times 10^{-3}$ g, i.e., 0.23 wt. % G) glycerol to compensate for the missing 0.15 moles of —$CH_2OH$ so as to produce high quality polyisobutylene based polyurethane prepolymers, polyurethanes, and polyurethane nanocomposites.

The modest-to-poor mechanical and processing properties of polyurethanes prepared with, for example, polyisobutylene-diols of $f_{nCH2OH}$<2.0 are significantly improved by covalent incorporation of calculated minor amounts of a small chain diol, such as glycerol. Similarly, incorporation of a small chain diol, such as glycerol, into polyurethane nanocomposites significantly improves static and dynamic mechanical properties, creep, time dependent stability, processing characteristics, and thermal resistance as compared to conventional polyurethane that do not include glycerol or other short chain diols. A small chain diol, such as glycerol, also significantly enhances viscoelasticity and broadens the range of service temperatures of polyurethane nanocomposites as compared to those without such small chain diols. Recovery after long term loading is very rapid and permanent deformation (set) is virtually absent. It is believed that these observations can be interpreted in terms of changes in micromorphology, specifically, by the small chain diol producing various types of new H-bonds between hard phases, and between hard phases and nanolayers of polyurethane nanocomposites. These observations lead to the conclusion that the small chain diols, such as glycerol, are an H-bond creating chain extender.

It has been found that the addition of a minor amount of a small chain diol, such as glycerol, to polyurethanes leads to increased stress at break, elongation at break, elastic modulus, and energy at break as compared to the stress at break, elongation at break, elastic modulus, and energy at break as compared to polyurethanes made without the addition of a minor amount of a small chain diol, such as glycerol. It has also been found that the addition of minor amounts of a small chain diol, such as glycerol, and a minor amount of a layered clay exfoliated with organic quaternary ammonium salts having alkyl substituents, wherein at least one of the alkyl substituents carries an —$NH_2$ group to polyurethanes leads to increased stress at break, elongation at break, and energy at break as compared to both polyurethanes made with a minor amount of glycerol and to polyurethanes made without the addition of a minor amount of glycerol. Additionally, it has also been found that the addition of minor amounts of both a small chain diol, such as glycerol, and a minor amount of a layered clay exfoliated with organic quaternary ammonium salts having alkyl substituents, wherein at least one of the alkyl substituents carries an —$NH_2$ group to polyurethanes leads to increased creep compliance and recoverable creep compliance as compared to polyurethanes prepared without the addition of a minor amount of glycerol and a minor amount of a layered clay exfoliated with organic quaternary ammonium salts having alkyl substituents, wherein at least one of the alkyl substituents carries an —$NH_2$ group. These are all believed to be unexpected properties, given the very small amount of small chain diols added to the polyurethanes.

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is number average molecular weight, temperature is in degrees Centigrade, and pressure is at or near atmospheric.

Materials, Instrumentation, and Techniques

Reagent grade 3-dimethylaminopropylamine (DMPA), methyl iodide, bis-4-(isocyanatocyclohexyl)methane (HMDI), dibutyltindilaurate (DBTL), 1,6-hexanediol (HDO), and glycerol ($CH_2OH$—$CHOH$—$CH_2OH$) were sourced from Aldrich and were used without further purification. Tetrahydrofuran (THF, Aldrich) was distilled prior to use. The sodium salt of montmorillonite (NaMMT), Nanofil, 1080, cationic exchange capacity 1000 meq/100 g) was sourced from Sud Chemie, City, Germany.

Gel permeation chromatography (GPC) date was obtained with a Waters instrument equipped with Styragel columns (HR 0.5, HR 1, HR 3, HR 4, HR 5, and HR 6) and a refractive index detector (Optilab, Wyatt Technology). Samples were dissolved in THF and the flow rate was 1 mL THF/min. Molecular weights were calculated using polystyrene calibration standards. Stress-strain behavior was determined by an Instrom model 5567 Universal Tester. A bench-top die was used to cut 30 mm dog-bone samples (30×3.5×0.2) from films. Samples were tested to failure at a cross-head speed of 20 mm/min at room temperature. Averages of at least four measurements are reported.

Thermogravimetric analysis (TGA) was performed by a TGA-Q500 instrument (TA Instruments) with about 8 mg samples heated from 20 to 600° C. at a heating rate of 10° C./min under $N_2$. Dynamic mechanical properties of films were measured with a dynamic mechanical analyzer (DMA-Q800, TA Instruments) in a tension mode at 1 Hz with 10° C. $min^{-1}$ heating rate over the −70 to 150° C. range. Average sample dimensions were 0.4×7×10 $mm^3$). Creep experiments were also performed with this instrument applying 1 MPa constant shear stress and measuring time-dependent deformation in terms of creep compliance.

Nomenclature

Polyisobutylene-based polyurethane (PIB-PU) prepared with imperfect PIB-diol (i.e., with $f_{n,CH2OH}$=1.85) is denoted by a prime sign: PIB'-PU. The symbol $N_x$ stands for a polyurethane nanocomposite, (i.e., a PIB'PU reinforced with OmMMT) with the subscript showing the wt. % OmMMT nanoclay used. G indicates 0.23 wt. % glycerol. For example, PIB'—PU/$N_{0.5}$/G indicates a polyurethane prepared with a PIB-diol of $f_{n,CH2OH}$=1.85, 0.5 wt. % OmMMT, and 0.23 wt. % glycerol.

Preparation and Characterization of Organically Modified Montmorillonite (OmMMT)

The modifying agent $I^{-+}N(CH_3)_3$—$CH_2CH_2CH_2$—$NH_2$ was synthesized under a $N_2$ atmosphere by dissolving 25 g (0.2 mole) DMPA in a 40 mL THF/$H_2O$ (1:1) mixture and adding dropwise 15 mL (0.24 mole) $CH_3I$ at 0° C. Subsequently, 2 g NaMMT was dispersed in 200 mL of a THF/$H_2O$ (1:1) mixture and stirred vigorously. To the agitated dispersion was slowly added to a solution of 1 g $I^{-+}N$($CH_3$)$_3CH_2CH_2CH_2$—$NH_2$ in 100 mL THF/$H_2O$ (1:1), and stirred for 1 hour. The OmMMT was recovered by filtration, and the filter cake was repeatedly washed with THF/$H_2O$ (1:1) to remove excess ions. Finally, the product was dried in a vacuum oven for 48 hours at 50° C.

Preparation of Polyisobutylene-Polyurethane with Polyisobutylene-diol of $f_{n,CH2OH}$=1.85

To 1 g polyisobutylene diol ($f_{n,CH2OH}$=1.85, Mn=4,200 g/mole, Mw/Mn=1.21) dissolved in 3 mL dry THF, 0.440 g (1.6×10$^{-3}$ moles) HMDI and a drop of DBTL catalyst (about 0.5% in dry THF) were added under a blanket of $N_2$ and the system was agitated for 3 hours at 65° C. After 3 hours, which is sufficient for the formation of the prepolymer, 0.116 g (9.3×10$^{-4}$ mole) HDO dissolved in 1 mL THF was added at 65° C. and the solution was vigorously stirred for 16 hours. The viscous system was diluted with about 5 mL dry THF and poured into 7×7 cm Teflon molds. The solvent was slowly added over about 4 days, evaporated at room temperature, the films were further dried in the mold for 2 days at 60° C., and was then dried by vacuum at 50° C. until weight constancy was reached. Finally, the films were annealed for 1 day at 120° C.

Preparation of Polyisobutylene-Polyurethane Reinforced with OmMMT (PIB'-PU/$N_{0.5}$)

The preparation of this nanocomposite was carried out using the same ingredients, amounts and procedure described above, except in the presence of OmMMT. Since —$NH_2$ groups will react with the —NCO groups of HMDI to give urea linkages, half of HMDI was pre-reacted with OmMMT. Thus, 0.0078 g OmMMT (0.5 wt. % loading) in 2 mL THF and 0.220 g (0.8×10$^{-3}$ moles) HMDI was ultrasonicated for 2 hours and added to the prepolymer solution. The compositions with 1 and 3 wt. % loadings were prepared similarly. The OmMMT-reinforced PIB'-PU was prepared by the same procedure except 0.0078 g (0.5 wt. %) OmMMT was added to the synthesis charge.

Preparation of PIB'PU Containing Glycerol (PIB'-PU/G

This synthesis, as shown in FIG. 1, was carried out by adding 2.3 mg (2.5×10$^{-5}$ moles) glycerol to the PIB'-diol solution as prepared above in the section entitled Preparation of Polyisobutylene-Polyurethane with Polyisobutylene-diol of $f_{n,CH2OH}$=1.85.

Preparation of PIB'PU Containing OmMMT and Glycerol (PIB'-PU/$N_x$/G)

Figure 2:
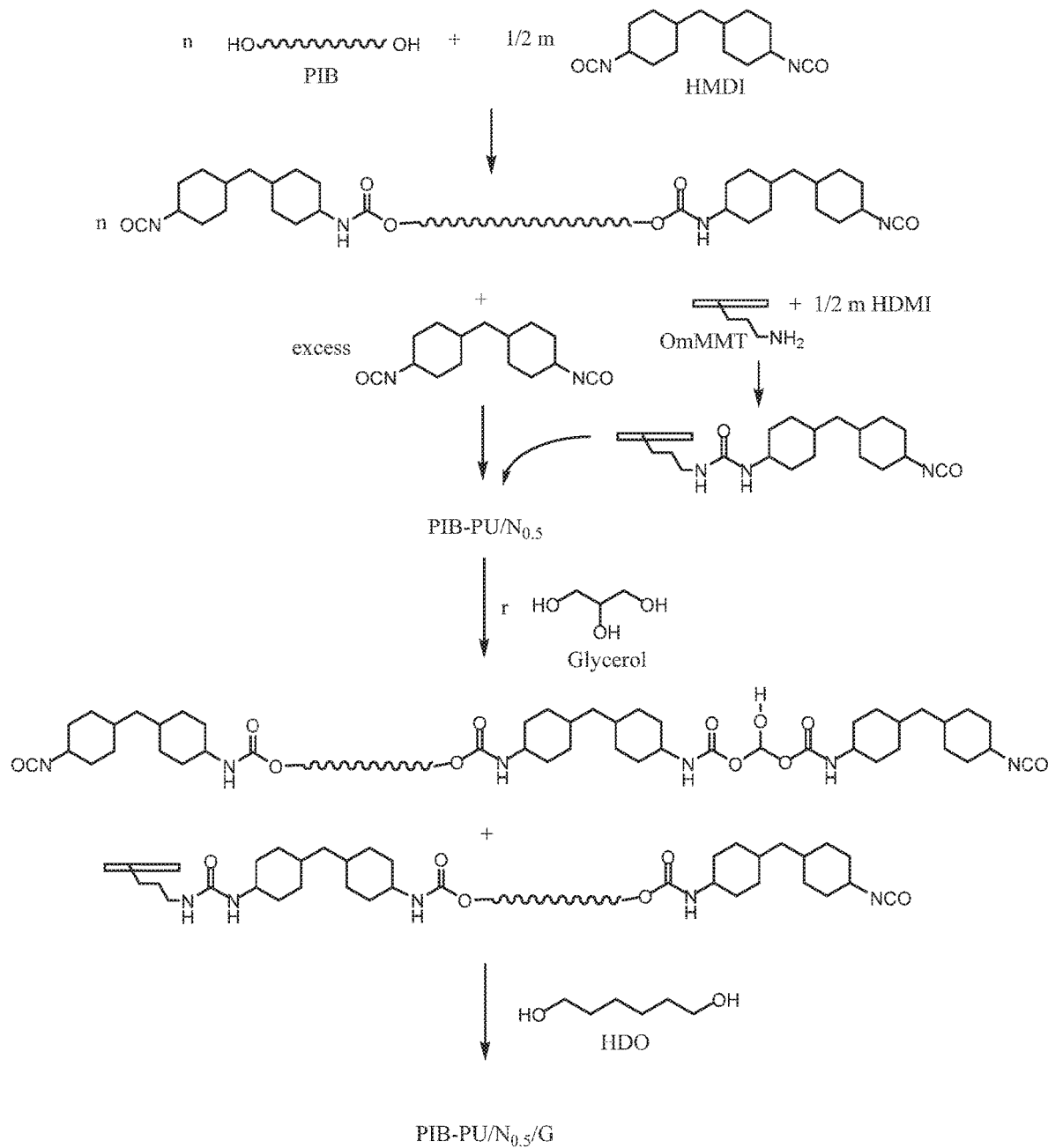
FIG. 2 is a synthesis scheme for the production of a polyisobutylene-based polyurethane including minor amount of glycerol and a minor amount of organically-modified montmorillonite (OmMMT) in accordance with the present invention.

This synthesis, as shown in FIG. 2, was carried out by adding 2.3 mg (2.5×10$^{-5}$ moles) of glycerol to the PIB'-PU/$N_{0.5}$ system as prepared above in the section entitled Preparation of Polyisobutylene-Polyurethane reinforced with OmMMT (PIB'-PU/$N_{0.5}$). The manner of glycerol addition is important for obtaining well-dispersed homogeneous systems. Clear transparent gel-free (no schlieren effect) solutions are obtained by adding glycerol under stirring to OmMMT-PIB-diol solutions stirred for 24 hours at room temperature.

Results and Discussion—The Effect of Glycerol

GPC traces of the PIB-diol ($f_{n,CH2OH}$=1.85) starting material, and PU's prepared with it in the absence and presence of glycerol (PIB'-PU and PIB'-PU/G) were taken and the results were observed to show the following. A shift of a sharp monomodal peak of the starting PIB-diol from Mn ~4,200 to ~25,000 g/mole associated with PIB'PU, and further to ~89,000 g/mole associated with PIB'PU/G were observed, which indicated that glycerol has significantly increased the product Mn, i.e., it is an effective chain extender. A broadening of the molecular weight distribution of the starting material to the product(s) (from Mw/Mn–1.21 to ~2.87 and to ~3.48) is expected upon polymerization. The amount of diisocyanate was calculated based on $f_{n,CH2OH}$=2.0 (not on $f_{n,CH2OH}$=1.85), thus the product contained 0.15 moles of unconverted diisocyanate.

Importantly, there was no sign of gelation/crosslinking in the GPC traces for the PU prepared with glycerol. This indicates that only the primary hydroxyl groups (—$CH_2OH$) of glycerol reacted to produce urethane bonds, and that the secondary hydroxyl group (—CHOH) did not produce covalent bonds, or otherwise the product would have gelled.

Results and Discussion—Static Mechanical Properties

Table 1 below shows static mechanical property date of a PU prepared with a PIB-diol of $f_{n,CH2OH}$=1.85 (PIB'-PU), a PU nanocomposite containing 0.5 2 wt. % OmMMT (PIB'PU/$N_{0.5}$), a PIB'PU containing 0.23 wt. % glycerol (PIB'-PU/G), and three PU nanocomposites containing 0.5, 1.0, and 3.0 wt. % OmMMT plus 0.23 wt. % glycerol (PIB'-PU/$N_x$/G).

TABLE 1

Static Mechanical Properties of Various Polyurethanes

| Sample | Stress at Break, MPa | Elongation at Break, % | Elastic Modulus, MPA | Energy at Break, J |
|---|---|---|---|---|
| PIB'-PU | 14 | 320 | 12 | 0.68 |
| PIB'PU/N$_{0.5}$ | 24 | 400 | 15 | 1.04 |
| PIB'-PU/G | 18 | 324 | 21 | 0.71 |
| PIB-PU/N$_{0.5}$/G | 29 | 408 | 16 | 1.72 |
| PIB'-PU/N$_{1.0}$/G | 21 | 394 | 14 | 1.10 |
| PIB'-PU/N$_{3.0}$/G | 26 | 420 | 16 | 1.20 |

The data shows a strong beneficial effect of both OmMMT and glycerol, and a strong synergistic effect on the combination of these additives, on the mechanical properties pf PIB'-PU's. Comparison of PIB'-PU with PIB'PU/N$_{0.5}$ confirms earlier findings by the authors that a small amount (0.5 wt. %) of OmMMT significantly enhances mechanical properties. In the presence of a well-defined small amount of OmMMT, this nanoclay and PU interact to yield enhanced mechanical properties. The increase in toughness may be of interest for vibration damping. The large increase in tensile strength and elongation at break of PIB'PU/N$_{0.5}$ is believed to be due to reinforcement by the well-dispersed exfoliated nanoclay layers between the soft and hard segments of the PU. Above ~0.5 wt. % OmMMT, the degree of OmMMT dispersion decreases, which is believed to compromise mechanical properties. The addition of a small amount (0.23 wt. %) of glycerol to PIB'PU/N$_{0.5}$ further enhances mechanical properties. Glycerol is believed to act as a dynamic H-bond donating/accepting chain extender. Under the reaction conditions employed (specifically, at 65° C.) glycerol's primary hydroxyl groups lead to rapid chain extension, whereas its secondary hydroxyl group does not form covalent bonds but is believed to instead produce H-bonds that lead to strongly interdigitated hard phases. Similarly to H-bond acceptor chain extenders HACEs, glycerol-derived H bonds (between two hard segments and/or between a hard segment and OmMMT) strengthen and toughen the construct.

Results and Discussion—Dynamic Mechanical Properties

Compared to PIB'-PU, PIB'-PU/G showed a huge increase in damping and a decreased storage modulus. It is known that dynamic H-bonds lead to soft and viscous type behavior if the time scale is sufficiently long for slow deformation by binding/unbinding. High friction in viscous materials leads to high damping, which in turn causes high tan delta values and low moduli values. The addition of glycerol to PIB'-PU/N$_{0.5}$ raised the Tg by ~7° C. and extending the rubbery plateau by ~20° C. These changes suggest increased dynamic H-bonding between hard segments and/or OmMMT nanolayers, i.e., increased energy storage, and somewhat decreased intensity in damping.

The addition of glycerol significantly extending the rubbery plateau and increased the flow temperature (up to ~120° C.). These results suggested that glycerol augments viscoelasticity that is the reorientation of phases under stress by dynamic H-bonding, particularly with 0.5 wt. % OmMMT. These results seemed to show that glycerol-containing PIB prepolymers, PIB polyurethanes, and PIB polyurethane nanocomposites are strong materials with high storage moduli over a very wide temperature range. Maximum performance (long rubbery plateau and increased storage moduli) were obtained with PIB'-PUs containing up to 3 wt. % OmMMT and 0.23 wt. % glycerol.

Results and Discussion—Creep

Creep is time dependent deformation under stress. The results of the dynamic mechanical data testing showed that in the presence of glycerol, OmMMT polyurethane nanocomposites exhibited increased rubbery plateaus and flow temperatures (up to ~120° C.). These results suggested that glycerol increases viscoelasticity by dynamic H-bonding, particularity with 0.5 wt. % OmMMT nanocomposites. Slow deformation in response to sustained long time force or shape changes in response to a slow force is typical viscous behavior of networks held together by dynamic crosslinks. In the presence of higher than 0.5 wt. % OmMMT, creep compliance decreases most likely due to the many H bonds with stiff nanolayers.

The difference between creep compliance and recoverable creep gives information in regard to permanent deformation. Table 2 below shows the creep compliance, recoverable creep and permanent set values of a PU prepared with a PIB-diol of $f_{n,CH2OH}$=1.85 (PIB'-PU), a PU nanocomposite containing 0.5 2t % OmMMT (PIB'PU/N$_{0.5}$), a PIB'PU containing 0.23 wt. % glycerol (PIB'-PU/G), and three PU nanocomposites containing 0.5, 1.0, and 3.0 wt. % OmMMT plus 0.23 wt. % glycerol (PIB'-PU/N$_x$/G).

TABLE 2

Creep Compliance, Recoverable Compliance, and Permanent Set after load removal of Various Polyurethanes

| Sample | Creep Compliance ($\mu m^2/N \times 10^{-3}$) | Recoverable Compliance ($\mu m^2/N \times 10^{-3}$) | Permanent Set (%) |
|---|---|---|---|
| PIB'-PU | 241 | 193 | 20 |
| PIB'PU/N$_{0.5}$ | 313 | 275 | 12 |
| PIB'-PU/N$_{0.5}$/G | 295 | 287 | 3 |
| PIB'-PU/N$_{1.0}$/G | 258 | 222 | 14 |
| PIB'-PU/N$_{3.0}$/G | 228 | 192 | 16 |

Although PIB'-PU/N$_{0.5}$/G exhibits high creep, its permanent set is surprisingly low, practically negligible (3%). Rapid recovery and the virtual absence of permanent deformation are likely due to strongly interdigitated interphases acting as strong reversible physical crosslinks. This unique property is also expected to lead to microscopic stress release, strain distribution, shape adjustment and recovery after failure.

Results and Discussion—Thermal Stability

TGA traces of PIB'-PU and PIB'-PU/N$_{0.5}$/G were taken and the results were observed to show the following. The thermal stability of PIB'-PU/N$_{0.5}$/G was significantly greater (~14° C. at 50 wt. % loss) than that of the PIB'PU. Increased interfacial interaction between the polymer matrix and the OmMMT nanolayers leads to increased activation energy of degradation. In the presence of nanoclays, mass transport and radical recombinations are delayed, thus, OmMMT is a thermal stabilizer. It is believed that the presence of the glycerol further enhances these effects.

Thermal degradation temperature and thermal degradation rates were plotted for PIB'PU, PIB'-PU/N$_{0.5}$, and PIB-PU/N$_{0.5}$/G. The hard phases were shown to degrade at ~425° C. while the soft PIB phases were shown to degrade at ~406° C. Glycerol raised the degradation temperature, particularly that of the soft phase by ~20° C. The multiple degradations between the hard and soft phases suggested interdigitated phases between the glycerol and OmMMT.

Results and Discussion—Chemical Considerations and Micromorphology

Figure 3A:
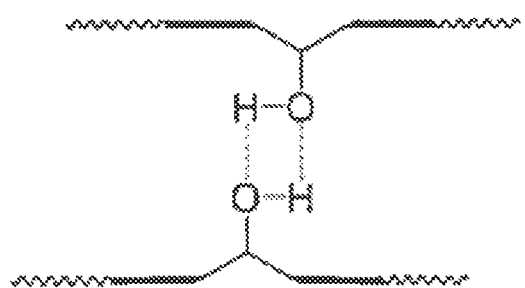
FIG. 3A shows the type of H-bond generated between two —CHOH groups.
Figure 3B:
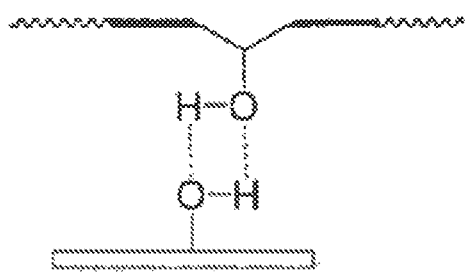
FIG. 3B shows the type of H-bond generated between a —CHOH group and an —OH group of OmMMT.
Figure 3C:
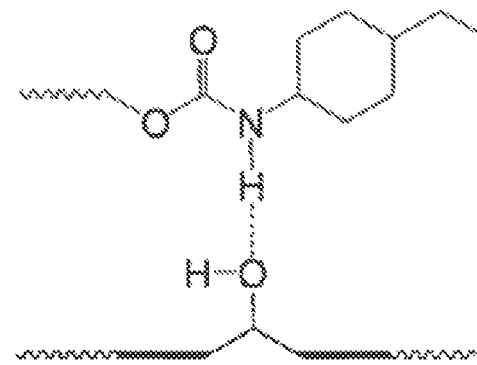
FIG. 3C shows various H-bonds generated between —CHOH groups and hard segments of a polyurethane.

The results and discussions above may be interpreted in terms of complex microarchitectures containing numerous new H-bonds produced by glycerols —CHOH group. FIGS. 3A, 3B, and 3C show the types of H-bonds generated by glycerol in PIB'-PU. FIG. 3A shows the type of H-bond generated between two —CHOH groups, FIG. 3B shows the type of H-bond generated between a —CHOH group and an —OH group of OmMMT, and FIG. 3C shows various H-bonds generated between —CHOH groups and hard segments of a PU. In FIG. 3B, for clarity's sake, only one of the numerous —OH groups of OmMMT is shown.

As glycerol is always situated between hard segments, it can be considered an —CHOH carrying chain extender. While glycerol's two —CH$_2$OHs yield urethane bonds with prepolymer —NCO groups, its —CHOH group remains unreacted and yields numerous types of H-bonds. The fact that the —CHOH groups of the glycerol did not form covalent bonds was demonstrated by the formation of soluble products. H bonding must be particularly strong in the presence of OmMMT dues to its numerous —OH groups. The various interphases arising between hard segments (including OmMMT) leads to more homogeneous stress distribution, and thus to improved mechanical properties. PIB'-PU/N/G contains particularly complex mixtures of hard segments comprising PIB-diols and/or OmMMT nanolayers covalently connected to the conventional chain extender (e.g., HDO) and/or to glycerol. Such microarchitectures are expected to yield significantly enhanced mechanical properties, i.e., increased strength, toughness, etc., and reduced creep. As H-bonds represent low energy barriers to deformation, hard segment reorganization under stress will occur readily, which facilitates processibility.

In light of the foregoing, it should be appreciated that the present invention significantly advances the art by providing novel polyurethanes and polyurethane nanocomposites that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polyurethane comprising the reaction product of:
   a. a diol and/or a diamine having a number average molecular weight of at least 750 g/mole;
   b. a stoichiometric excess amount of diisocyanate;
   c. from 0.01 to 4.0 weight percent, based upon the total polymer composition, of glycerol; and
   d. a 1,4-butane diol (BDO) chain extender,
   wherein the polyurethane exhibits increased damping and decreased storage modulus as compared to polyisobutylene-based polyurethanes.

2. The polyurethane of claim 1, wherein the diol is selected from the group consisting of polyisobutylene-based diols, polyether polyols, polysiloxane polyols, and polycarbonate polyols, and combinations thereof.

3. The polyurethane of claim 2, wherein the diol is selected from the group consisting of HO—PIB—OH, HO—PTMO—OH, or a combination thereof, and wherein each diol has a molecular weight of at least 1000 g/mole.

4. The polyurethane of claim 1, wherein the diisocyanate is selected from the group consisting of 4,4'-methylene diphenyl diisocyanate (MDI) and/or 4,4'-methylene dicyclohexyl diisocyanate (HMDI).

5. The polyurethane of claim 1, wherein from 0.10 to 1.00 weight percent, based on the total polymer composition, of the glycerol is used.

6. The polyurethane of claim 5, wherein from 0.15 to 0.50 weight percent, based on the total polymer composition, of the glycerol is used.

7. The polyurethane of claim 1, further comprising 0.001 to 1.0 weight percent, based upon the total polymer composition, of a layered clay with organic quaternary ammonium salts having alkyl substituents, wherein at least one of the alkyl substituents carries an —NH$_2$ group.

8. The polyurethane of claim 7, wherein the layered clay is selected from the group consisting of 2:1 phyllosilicates-smectite groups, montmorillonite, beidellite, nontronite, saponite, (F-)hectorite, stevensite, vermiculite, paragonite, clinochlore and thuringite.

9. The polyurethane of claim 7, wherein from 0.001 to 0.9 weight percent, based on the total polymer composition, of layered clay exfoliated with organic quaternary ammonium salts having alkyl substituents, wherein at least one of the alkyl substituents carries an —NH$_2$ group, is used.

10. The polyurethane of claim 9, wherein from 0.1 to 0.7 weight percent, based on the total polymer composition, of layered clay exfoliated with organic quaternary ammonium salts having alkyl substituents, wherein at least one of the alkyl substituents carries an —NH$_2$ group, is used.

11. The polyurethane of claim 10, further comprising less than 1 weight percent, based upon the total polymer composition, of a layered clay with organic quaternary ammonium salts having alkyl substituents, wherein at least one of the alkyl substituents carries an —NH$_2$ group.

12. A polyurethane comprising the reaction product of:
   a. a diol and/or a diamine having a number average molecular weight of at least 750 g/mole;
   b. a stoichiometric excess amount of diisocyanate;
   c. from 0.01 to 4.0 weight percent, based upon the total polymer composition, of glycerol;
   d. less than 1 weight percent, based upon the total polymer composition, of a layered clay with organic quaternary ammonium salts having alkyl substituents, wherein at least one of the alkyl substituents carries an —NH$_2$ group; and
   e. a 1,4-butane diol chain extender,
   wherein the polyurethane exhibits lower permanent deformation than exhibited by polyisobutylene-based polyurethanes.

13. The polyurethane of claim 12, wherein the diol is selected from the group consisting of polyisobutylene-based diols, polyether polyols, polysiloxane polyols, and polycarbonate polyols, and combinations thereof.

14. The polyurethane of claim 13, wherein the diol is selected from the group consisting of HO—PIB—OH, HO—PTMO—OH, or a combination thereof, and wherein each diol has a molecular weight of at least 1000 g/mole.

15. The polyurethane of claim 12, wherein the diisocyanate is selected from the group consisting of 4,4'-methylene diphenyl diisocyanate (MDI) and/or 4,4'-methylene dicyclohexyl diisocyanate (HMDI).

16. The polyurethane of claim 12, wherein from 0.10 to 1.00 weight percent, based on the total polymer composition, of the glycerol is used.

17. The polyurethane of claim 12, wherein from 0.15 to 0.50 weight percent, based on the total polymer composition, of the glycerol is used.

18. The polyurethane of claim 12, wherein the layered clay is selected from the group consisting of 2:1 phyllosilicates-smectite groups, montmorillonite, beidellite, nontronite, saponite, (F-)hectorite, stevensite, vermiculite, paragonite, clinochlore and thuringite.

19. The polyurethane of claim 18, wherein from 0.001 to 0.9 weight percent, based on the total polymer composition, of layered clay exfoliated with organic quaternary ammonium salts having alkyl substituents, wherein at least one of the alkyl substituents carries an —$NH_2$ group, is used.

20. The polyurethane of claim 19, wherein from 0.1 to 0.7 weight percent, based on the total polymer composition, of layered clay exfoliated with organic quaternary ammonium salts having alkyl substituents, wherein at least one of the alkyl substituents carries an —$NH_2$ group, is used.

* * * * *